United States Patent
Beyerlein et al.

(10) Patent No.: US 11,333,234 B2
(45) Date of Patent: May 17, 2022

(54) SYSTEM, METHOD AND APPARATUS FOR METALLIC GEAR HUB WITH METALLIC TEETH HAVING OUTER POLYMER LAYER

(71) Applicant: Steering Solutions IP Holding Corporation, Saginaw, MI (US)

(72) Inventors: Jeffrey E. Beyerlein, Frankenmuth, MI (US); Alan G. Turek, Mayville, MI (US); Himadri Shastry, Saginaw, MI (US); Jason T. Rutkiewicz, Freeland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 117 days.

(21) Appl. No.: 16/709,062

(22) Filed: Dec. 10, 2019

(65) Prior Publication Data
US 2021/0172507 A1   Jun. 10, 2021

(51) Int. Cl.
| | |
|---|---|
| F16H 55/12 | (2006.01) |
| F16H 55/06 | (2006.01) |
| F16H 35/10 | (2006.01) |
| B29D 15/00 | (2006.01) |
| F16H 57/00 | (2012.01) |
| F16H 57/032 | (2012.01) |
| F16H 1/08 | (2006.01) |

(52) U.S. Cl.
CPC ............ *F16H 55/06* (2013.01); *B29D 15/00* (2013.01); *F16H 1/08* (2013.01); *F16H 35/10* (2013.01); *F16H 57/0031* (2013.01); *F16H 57/032* (2013.01)

(58) Field of Classification Search
CPC .......................... F16H 2055/065; F16H 55/06
See application file for complete search history.

(56) References Cited

U.S. PATENT DOCUMENTS

| | | |
|---|---|---|
| 3,469,465 A | 9/1969 | Bebbington, Jr. et al. |
| 3,602,058 A | 8/1971 | Beddoe |
| 3,999,445 A | 12/1976 | Liautaud |
| 5,852,951 A | 12/1998 | Santi |
| 2007/0082547 A1 | 4/2007 | Komoto et al. |
| 2010/0320025 A1 | 12/2010 | Beyerlein et al. |
| 2016/0017976 A1* | 1/2016 | Iijima ................ B29C 45/1459 74/446 |
| 2017/0261087 A1* | 9/2017 | White ................ B23K 15/0086 |

FOREIGN PATENT DOCUMENTS

| | | |
|---|---|---|
| CH | 533261 A | 3/1973 |
| DE | 1803772 C | 3/1974 |

OTHER PUBLICATIONS

German Patent and Trademark Office, Official Letter for German Patent Application 10 2020 131 511.2, dated Jan. 26, 2022.

* cited by examiner

*Primary Examiner* — Jake Cook
(74) *Attorney, Agent, or Firm* — Dickinson Wright PLLC (57) ABSTRACT

Embodiments of a system, method and apparatus for a gear are disclosed. For example, a metallic gear hub can include an axis of rotation and metallic gear teeth. The metallic gear teeth can be smaller than a final gear teeth size of the gear. The metallic gear teeth can be co-planar with the axis. In addition, the metallic gear teeth can be non-orthogonal to the axis. A polymer layer can be located on the metallic gear teeth to form polymer gear teeth on the metallic gear teeth. The polymer gear teeth can form the final gear teeth size of the gear.

4 Claims, 9 Drawing Sheets

SYSTEM, METHOD AND APPARATUS FOR METALLIC GEAR HUB WITH METALLIC TEETH HAVING OUTER POLYMER LAYER

BACKGROUND OF THE DISCLOSURE

Figure 1:
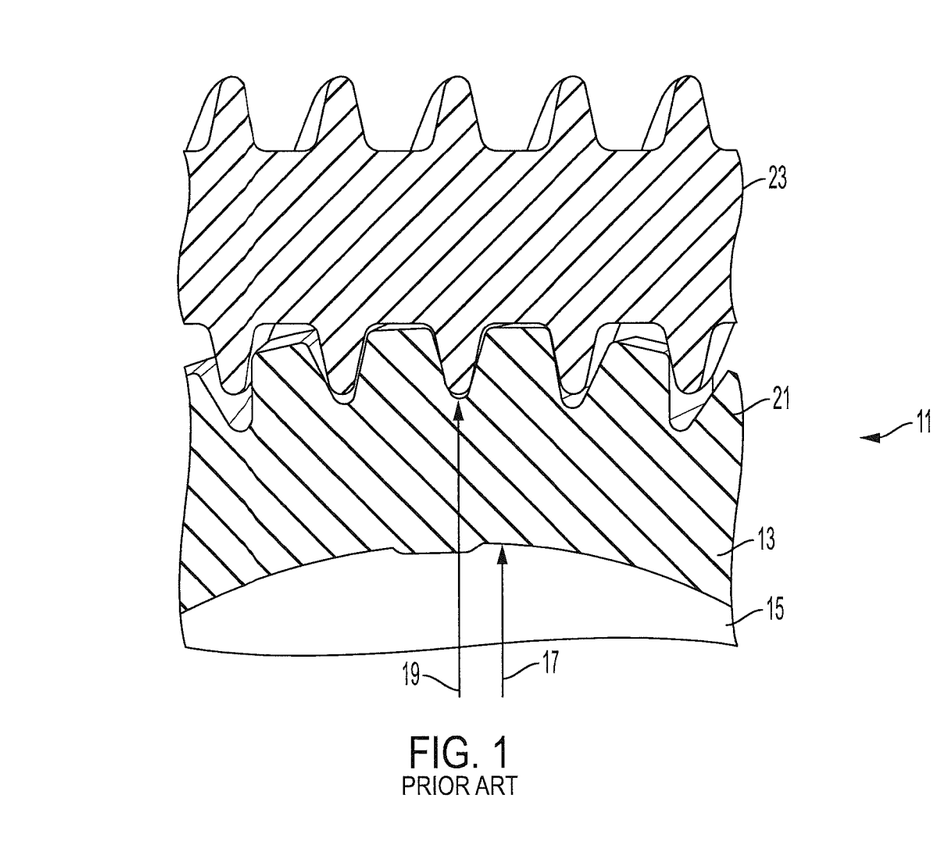
FIG. 1 is an illustration of a conventional worm gear drive system.

FIG. 1 depicts a conventional worm gear 11 having an outer plastic ring 13 that is bonded or molded to an inner steel hub 15. The outer diameter 17 of the steel hub 15 is smaller than the root diameter 19 of the gear teeth 21. The gear teeth 21 are formed entirely from plastic and are coupled to a worm shaft 23. Plastic teeth are beneficial for better noise, vibration and harshness (NVH) performance, but plastic teeth have durability limitations. As customer demand for output torque increases, a more robust gear solution is needed. Although these solutions are workable, improvements in gear design continue to be of interest.

SUMMARY OF THE DISCLOSURE

Embodiments of a system, method and apparatus for a gear are disclosed. For example, a metallic gear hub can include an axis of rotation and metallic gear teeth. The metallic gear teeth can be smaller than a final gear teeth size of the gear. The metallic gear teeth can be co-planar with the axis. In addition, the metallic gear teeth can be non-orthogonal to the axis. A polymer layer can be located on the metallic gear teeth to form polymer gear teeth on the metallic gear teeth. The polymer gear teeth can form the final gear teeth size of the gear.

Embodiments of a method of forming a gear can include forming a metallic gear hub with metallic gear teeth that are smaller than a final gear teeth size of the gear. The method can include blasting the metallic gear hub to a desired surface finish and applying a primer to the metallic gear teeth. The method can further include heating the metallic gear hub and dipping the metallic gear teeth in a fluidized bed of polymer powder and forming a polymer coating on the metallic gear teeth. The method can conclude by processing the polymer coating on the metallic gear teeth to the final gear teeth size of the gear.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description can be had by reference to the embodiments thereof that are illustrated in the appended drawings. However, the drawings illustrate only some embodiments and therefore are not to be considered limiting in scope as there can be other equally effective embodiments.

DETAILED DESCRIPTION

FIGS. 2-8 depict various embodiments of a system, method and apparatus for a metallic (e.g., steel) gear hub with metallic teeth having a polymer outer layer that can comprise extensions on the metallic teeth. For example, FIGS. 2A-2F illustrate a series of images depicting embodiments of a gear and method forming the gear. Forming the gear can involve, for example, a press fit and heat, such as induction heat. Versions can include forming a polymer outer ring 101 (FIG. 2A), such as by injection molding. The polymer outer ring 101 can include inner plastic teeth 103.

Figure 2A:
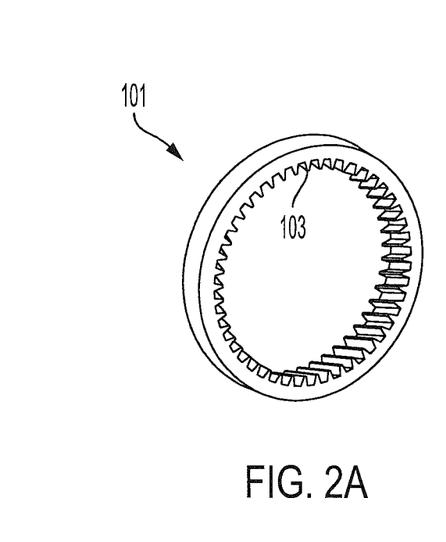
FIGS. 2A through 2F are a series of images depicting embodiments of a gear and method of forming the gear.
Figure 2B:
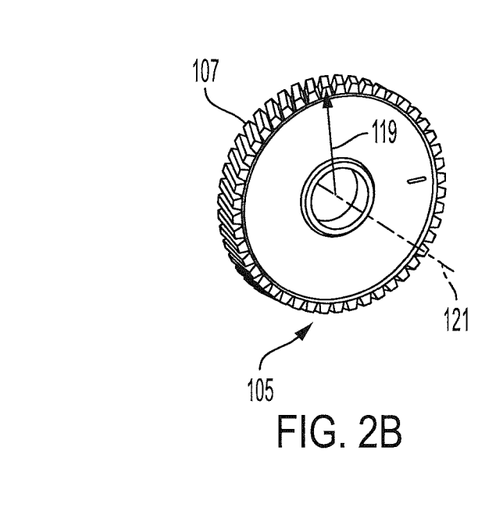
Figure 2C:
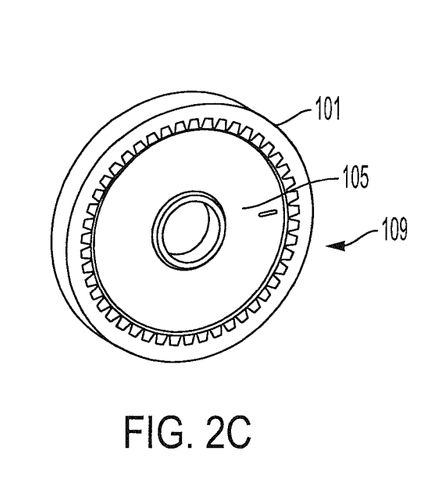
Figure 2D:
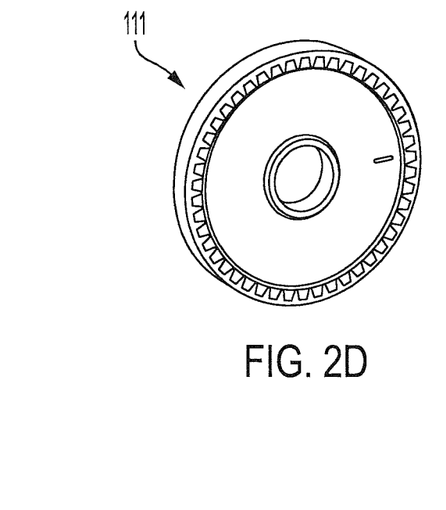
Figure 2E:
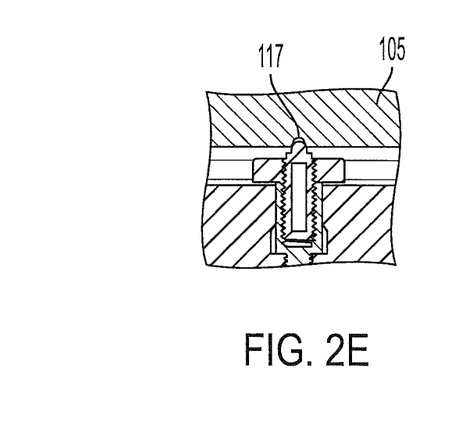
Figure 2F:
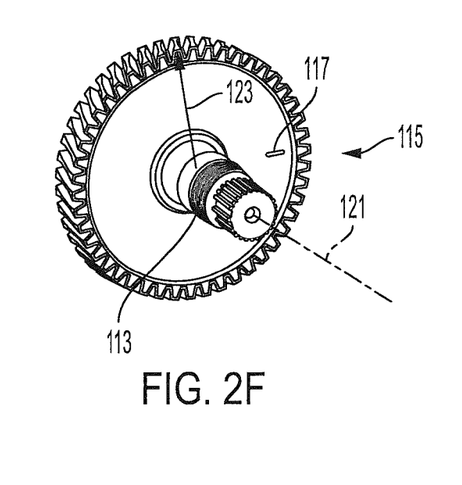

In addition, a metallic gear hub 105 (FIG. 2B) with outer metal teeth 107 can be formed. The metallic gear hub 105 can be cast, forged, formed by powder metallurgy (PM), etc. The metal teeth 107 of the metallic gear hub 105 can be blasted (e.g., sand blasted) to a desired finish. The metal teeth 107 can have an adhesion promoter applied to them. As shown in FIG. 2C, the polymer outer ring 101 can be pressed (e.g., press fit) onto the metallic gear hub 105 to form a ring and hub assembly 109. The ring and hub assembly 109 can be heated (e.g., induction heated) to bond the polymer outer ring 101 to the metallic gear hub 105 to form a gear blank 111 (FIG. 2D). After the edges and outside diameter of the gear blank 111 are trimmed to final dimensions, the gear blank 111 can be pressed onto a shaft 113 to form a gear assembly 115 (FIG. 2F). The metallic gear hub 105 can include a locating or timing notch 117 (FIG. 2E) that can be used to properly align the gear assembly 115 in a gear teeth cutting machine (e.g., a hobbing machine) to cut the final gear teeth in the gear assembly 115 to form a final product. The hobbing machine can include a plunger, such as a spring-actuated plunger, to engage the timing notch 117.

Each metal tooth 107 of the metallic gear hub 105 can have a tooth size or radial dimension 119 (FIG. 2B) relative to a rotational axis 121 of the metallic gear hub 105. The radial dimension 119 of the metal teeth 107 can be less than a desired final gear tooth size or radial dimension 123 (FIG. 2F) of the layer of polymer (e.g., plastic) on an exterior of the metal teeth 107.

Figure 3A:
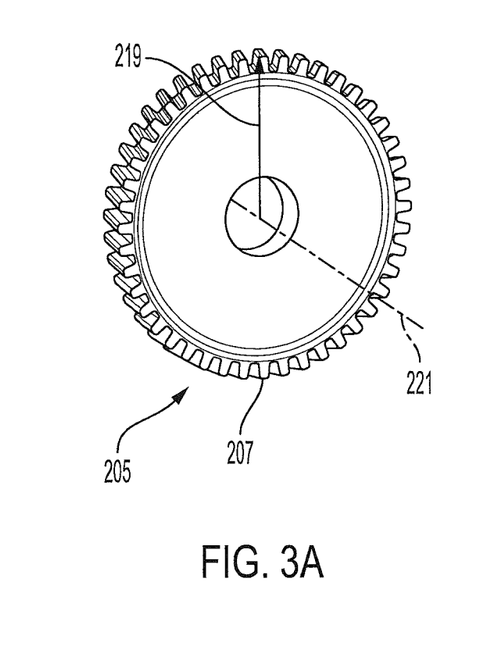
FIGS. 3A through 3C are a series of images depicting alternative embodiments of a gear and method of forming the gear.
Figure 3B:
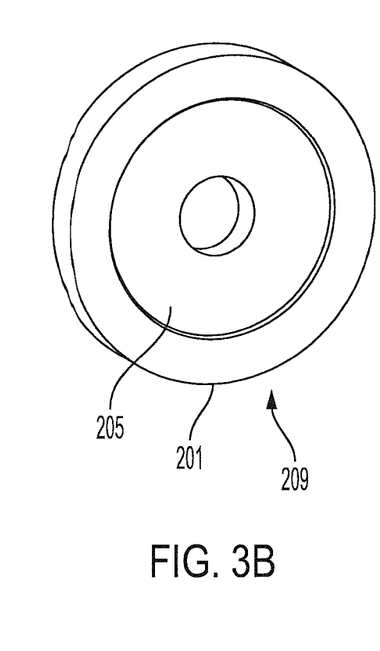
Figure 3C:
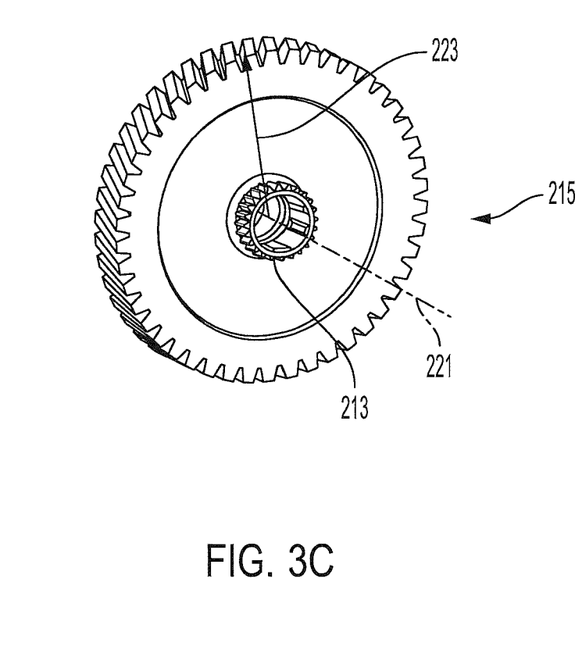

FIGS. 3A-3C illustrate a series of images depicting alternate embodiments of a gear and method of forming the gear. These versions can include molding, such as injection overmolding, a polymer 201 on a metallic gear hub 205. For this configuration, the metallic gear hub 205 can be cast, forged, PM, etc., with metallic teeth 207. Like the previous embodiment, the metallic teeth 207 on the metallic gear hub 205 can have a radial dimension 219 (FIG. 3A) relative to axis 221 that is less than the desired final gear radial dimension 223 (FIG. 3C) to allow for the polymer layer on the exterior of the metallic teeth 207. The metallic gear hub 205 can be placed in a mold cavity, and polymer 201 can be injection molded on the metallic gear hub 205 to form a gear blank 209 (FIG. 3B). As shown in FIG. 3C, the gear blank 209 can be trimmed to final dimensions, pressed onto a shaft 213, and then hobbed like the previous design into a final product comprising a gear assembly 215.

Figure 4A:
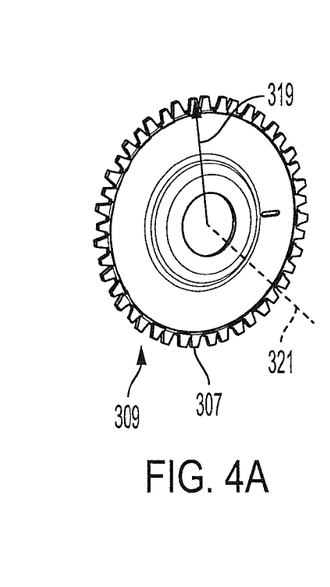
FIGS. 4A through 4C are a series of images depicting other embodiments of a gear and method of forming the gear.
Figure 4B:
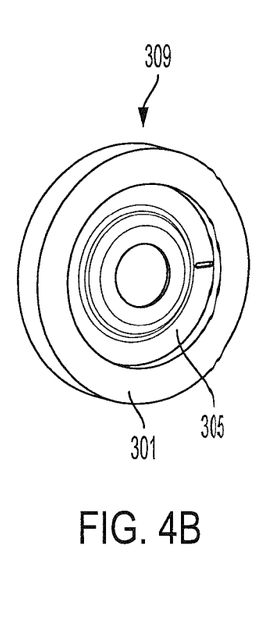
Figure 4C:
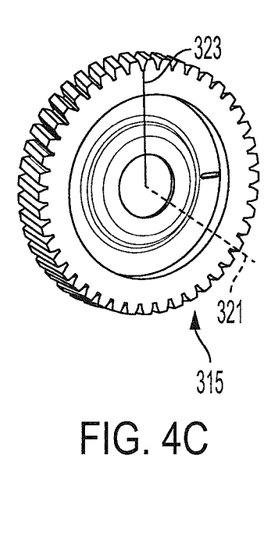

FIGS. 4A-4C depict a series of images illustrating other embodiments of a gear and method of forming, the gear. Like other embodiments, this version can include a metallic gear hub 305 (e.g., a stamped metallic gear hub) with a molding (e.g., injection overmolding) of polymer 301. For this configuration, the metallic gear hub 305 can be formed (e.g., stamped) with metallic teeth 307.

Figure 4D:
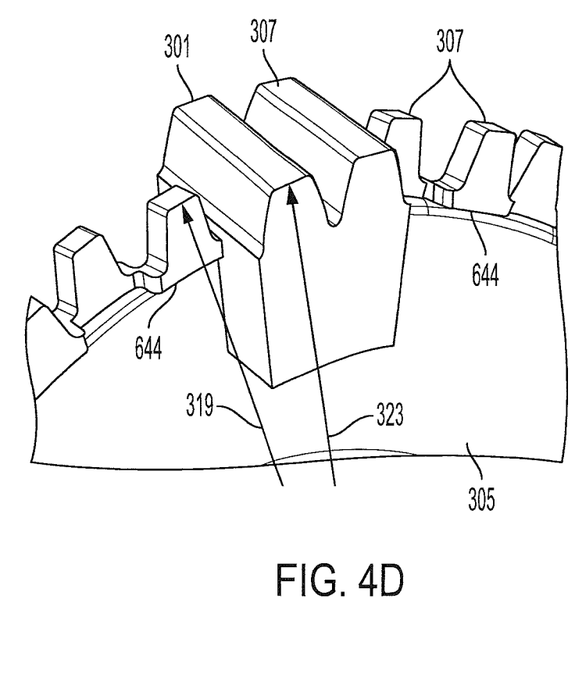
FIG. 4D is an enlarged view of a portion of the gear of FIG. 4C, with some of the polymer not shown to reveal the metallic teeth inside the polymer.

FIG. 4D is an enlarged view of a portion of the gear of FIG. 4C, with some of the polymer 301 not shown to reveal the metallic teeth 307 inside the polymer. The metallic teeth 307 can have a radial dimension 319 (FIGS. 4A and 4D) relative to axis 321 that is less than the desired final gear tooth radial dimension 323 (FIGS. 4C and 4D) to allow for the layer of polymer 301, The metallic gear hub 305 can be placed in a mold cavity, and the polymer 301 can be molded (e.g., injection molded) over the metallic gear hub 305 to form a gear blank 309 (FIG. 4B). The gear blank 309 can be trimmed to final dimensions, pressed to a shaft, and hobbed like the other designs to form a final product comprising a gear assembly 315 (FIG. 4C). Alternatively, this gear can be molded into a blank, or molded to its final shape.

Figure 5A:
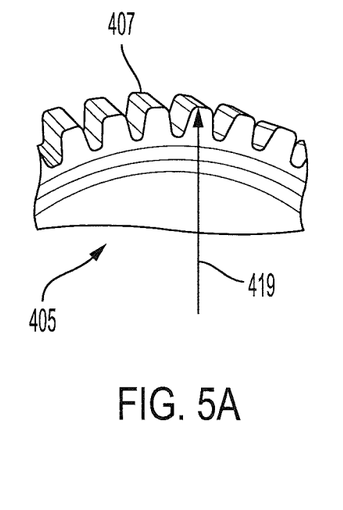
FIGS. 5A through 5C are a series of images depicting different embodiments of a gear and method of forming the gear.
Figure 5B:
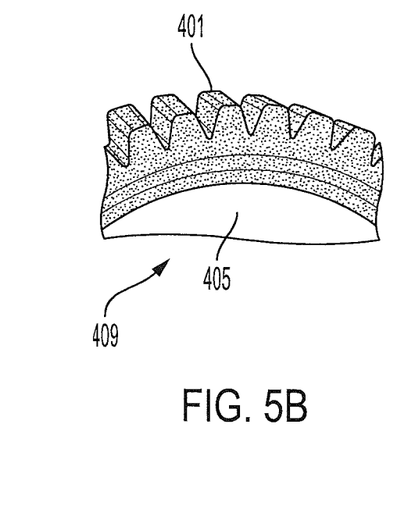
Figure 5C:
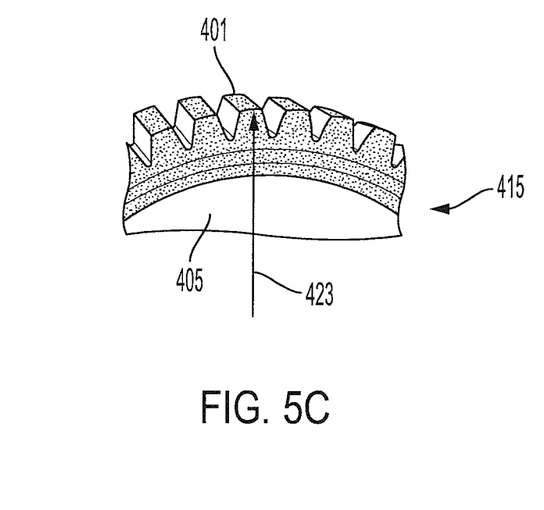

FIGS. 5A-5C are a series of images depicting still other embodiments of a gear and method of forming the gear. This version can include a metallic gear hub 405 with a coating, such as a powder-based coating of polymer 401. For this configuration, the metallic gear hub 405 can be formed with metallic teeth 407. The metallic teeth 407 of the metallic gear hub 405 can have a metal tooth radial dimension 419 (FIG. 5A) that is less than the desired final gear tooth radial dimension 423 (FIG. 5C) to allow for a coating thereon, such as a layer of powder coat based polymer 401. Prior to coating, the metallic gear hub 405 can be blasted (e.g., sand blasted) and a primer can be applied to it. The metallic gear hub 405 can be preheated to a selected temperature and dipped into a fluidized bed of the powder coat material of polymer 401. The heat and primer can cause the powder to bond to the metallic gear hub 405 to form a gear blank 409 (FIG. 5B). After this stage, the metallic gear hub 405 can appear to be a finished gear, but the powder coat process can provide a coating that can be made more uniform to be used as the final gear geometry. The next step can be to press the metallic gear hub 405 to a shaft and hob the gear as described in the previous designs into a gear assembly 415.

Figure 6A:
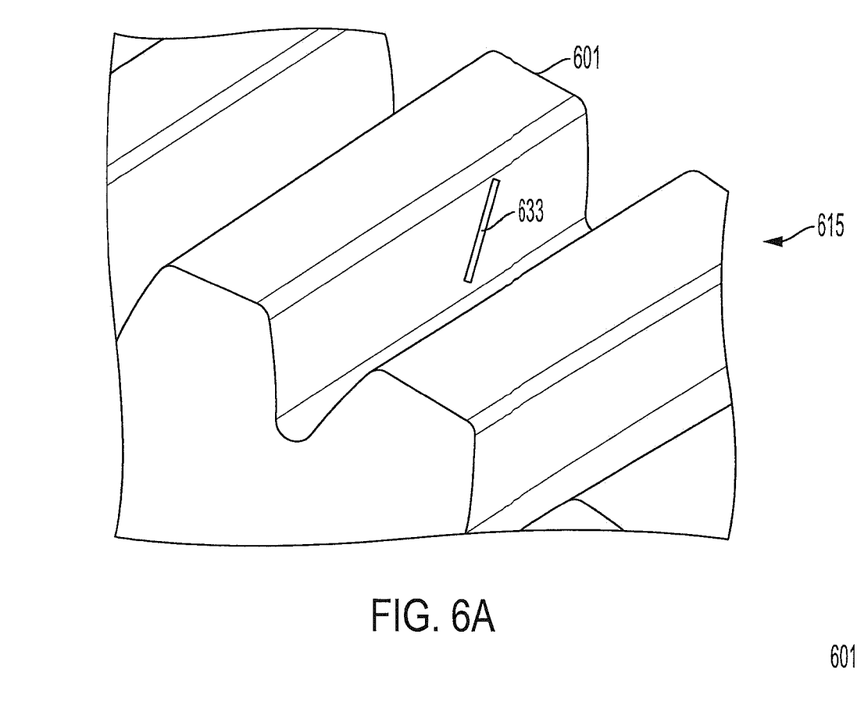
FIGS. 6A through 6C are enlarged schematic images of portions of embodiments of a gear.
Figure 6B:
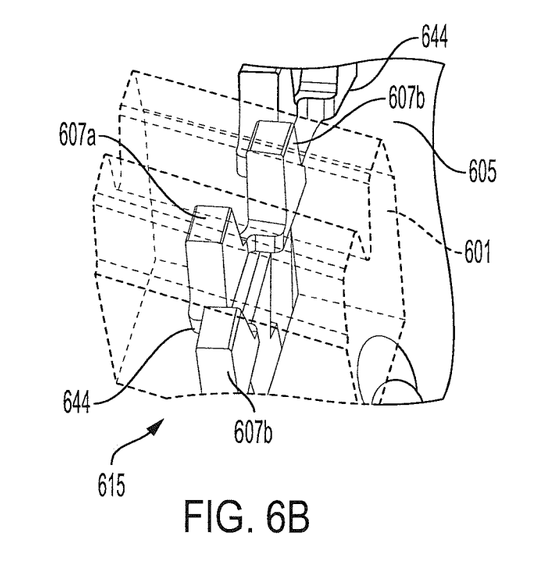
Figure 6C:
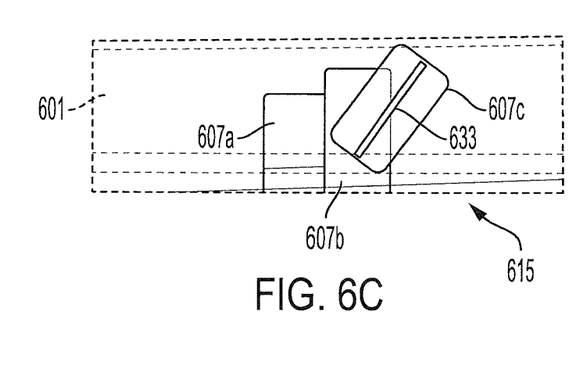

In FIGS. 6A-6C, embodiments of a gear 615 can include a metallic gear hub 605 having an axis of rotation and metallic gear teeth 607a and 607b. The axis of rotation can be parallel to the Y-axis in FIG. 7. The metallic gear teeth 607a, 607b can be oriented or configured relative to any of the X, Y or Z-axes, or rotated in respective roll, pitch and yaw rotational directions.

Embodiments of the metallic gear teeth 607a, 607b can be similar to metallic gear teeth 307 of FIG. 4. The metallic gear teeth 607a, 607b can be smaller than a desired final gear teeth size of the gear 615. In some versions, the metallic gear teeth 607a, 607b can be co-planar with the axis. Examples can include metallic gear teeth 607c (shown schematically) which are non-orthogonal to the axis. A polymer layer 601 can be formed on the metallic gear teeth 607a, 607b or 607c to form polymer gear teeth thereon, such that the polymer gear teeth comprise the final gear teeth size of the gear 615. Examples can include net shape molded teeth.

In addition, one or more of the metallic gear teeth 607a, 607b, 607c can form an overhang 644 (FIGS. 4D and 6B). Versions of the overhangs 644 can help retain the polymer layer 301, 601, respectively, thereon. The overhangs 644 can extend in opposite axial directions on respective ones of the metallic gear teeth 607a, 607b, 607c. In some examples, an outer axial dimension between opposite ones of the overhangs 644 can exceed an outer axial dimension of the metallic gear hub 605.

In some embodiments, the contact line 633 on a helical gear or mating worm shaft (not shown) can look like it is illustrated in FIGS. 6A and 6C. One or more of the shape, length and direction of the metallic gear teeth 607c can be complementary to or even match the contact line 633 (as shown in FIG. 6C) of the gear 615 to more directly react the load. Thus, metallic gear teeth 607c can be configured at an angle instead of in the parallel offset depicted by metallic gear teeth 607a, 607b.

The mating worm shaft (not shown) can contact the gear 615 along the contact line 633. For metallic gear teeth 607a, 607b, the contact line 633 or area can extend beyond the edges of the metallic gear teeth 607a, 607b. This could possibly shear the polymer layer 601 that is not directly supported by the metallic gear hub 605. This is not true for embodiments having metallic gear teeth 607c since the polymer layer 601 would be fully supported along the entire contact line 633. Some versions of the metallic gear teeth 607c can comprise rounded rectangle shapes, as shown. Such design can react directly against the metallic backing of the metallic gear hub 605, In some examples, the angled teeth can react the load only on every other tooth. In other examples, the contact ratio for worm gears is generally greater than two, so two teeth can always be in contact with the worm gear.

Figure 7:
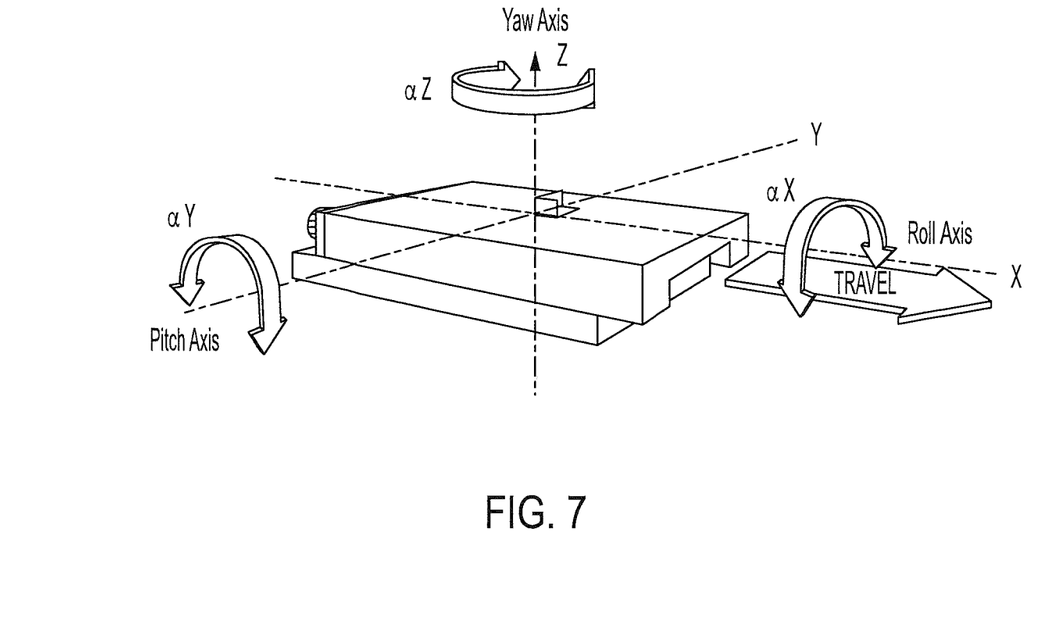
FIG. 7 is a diagram of a coordinate system for a gear.
Figures 8A, 8B:
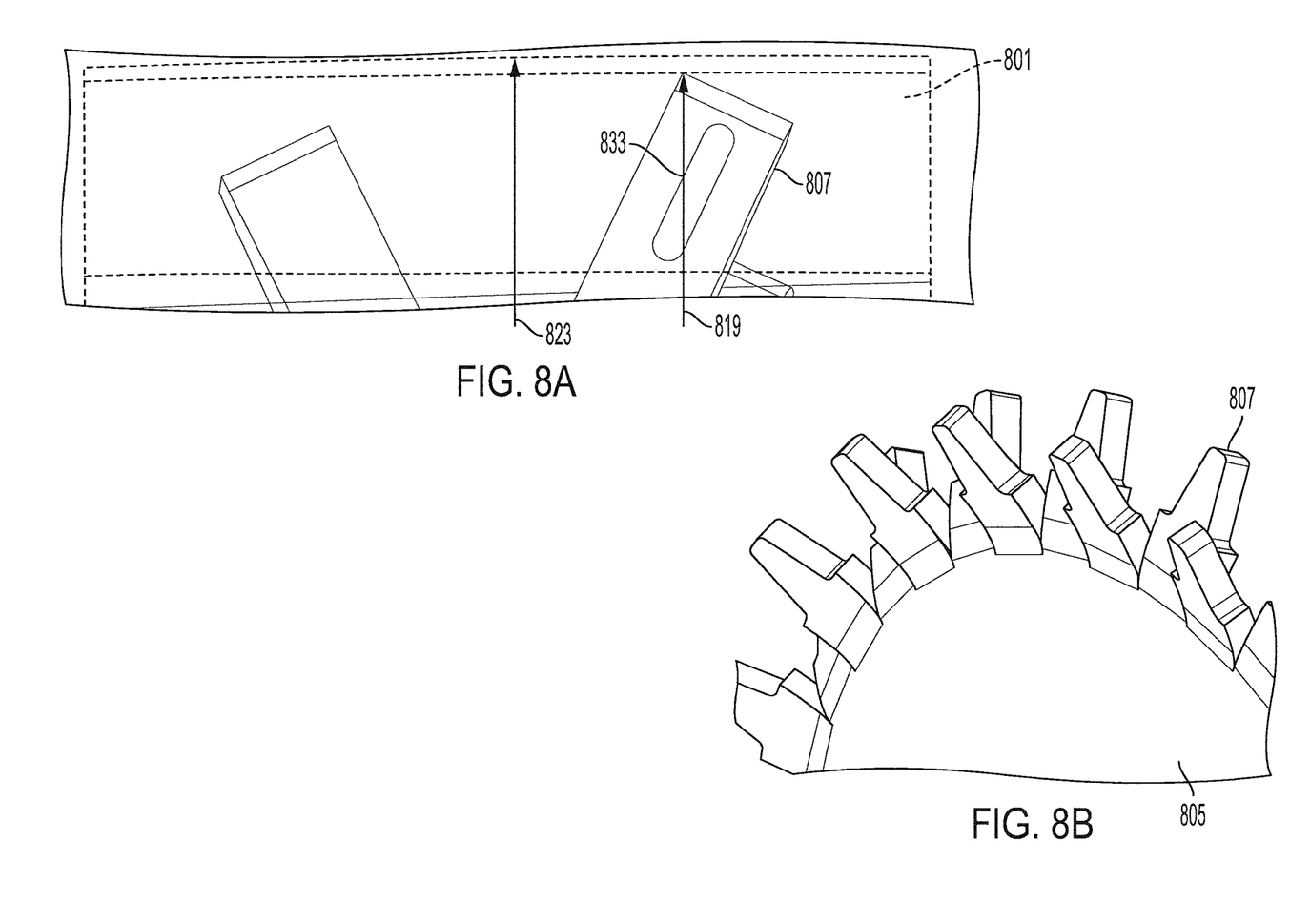
FIGS. 8A through 8D are isometric views of an embodiment of a gear and method of forming the gear.
Figure 8C:
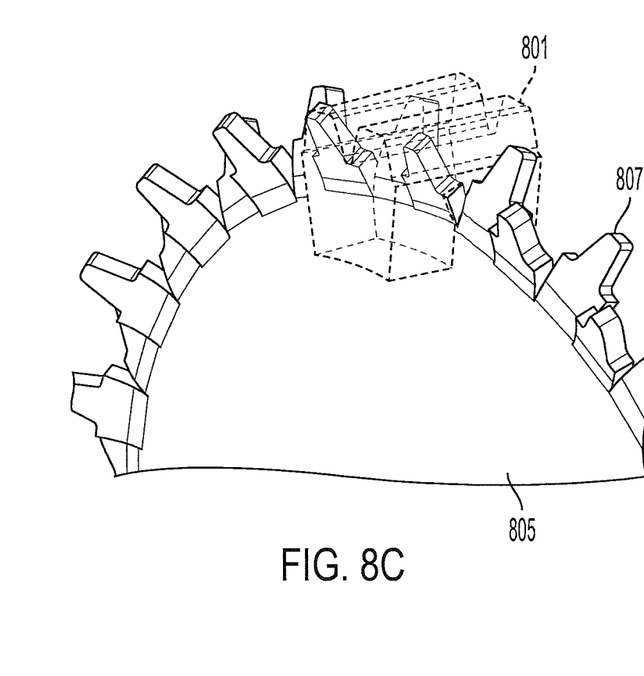
Figure 8D:
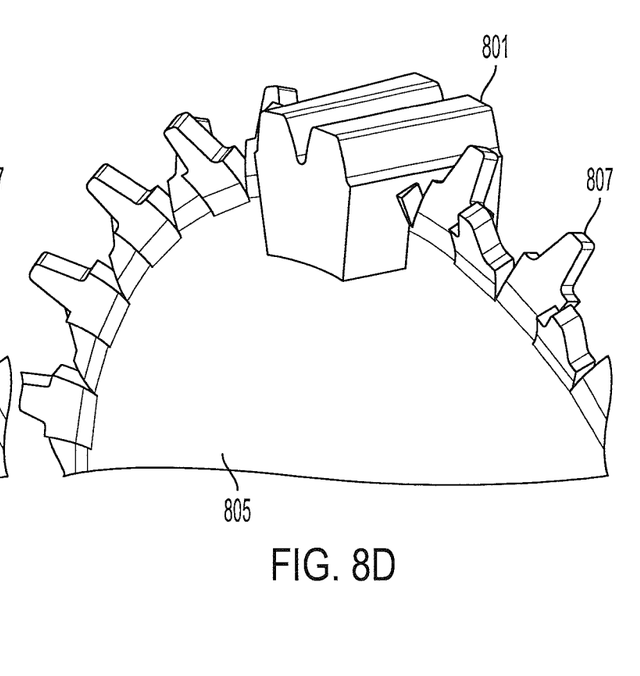

For example, the metallic gear teeth 607c can be oriented at an acute angle relative to the axis. In some versions, the acute angle can be in a range of about 30 degrees to about 60 degrees. Each of the metallic gear teeth can comprise a shape that is rectangular with rounded corners. Referring to FIG. 7, each of the metallic gear teeth 607c can be oriented at an acute roll angle relative to neutral, and both pitch and yaw angles of the metallic teeth can be neutral.

In some embodiments, at least some of the metallic gear teeth 607a, 607b can be offset from each other in the axial direction, instead of axially aligned. Some versions of the polymer gear teeth are not offset from each other. The metallic gear teeth 607a, 607b can comprise an alternating axial pattern on the metallic gear hub 605. Examples of the polymer gear teeth do not comprise an alternating pattern.

Embodiments of the metallic gear teeth 607a, 607b or 607c can comprise a metal axial width, and the polymer gear teeth can comprise a polymer axial width that exceeds it, such as at least double the metal axial width, at least triple or even at least quadruple that of the metallic gear teeth. In one example, the polymer axial width of the polymer gear teeth can be substantially equal to a metallic axial width of the metallic gear teeth. Versions of at least some of the metallic gear teeth can be axially offset from each other, and the polymer gear teeth can be not offset from each other. Examples of the metallic gear teeth can comprise an alternating pattern on the metallic gear hub, whereas the polymer gear teeth may not comprise an alternating pattern in some versions.

FIGS. 8A-8D illustrate a series of images depicting alternate embodiments of a gear and method of forming the gear. These versions can include molding, such as injection overmolding, a polymer 801 on a metallic gear hub 805. For this configuration, the metallic gear hub 805 can be formed as with the other embodiments with metallic teeth 807. As before, the metallic teeth 807 can have a radial dimension 819 relative to a rotational axis that is less than the desired final gear radial dimension 823 to allow for the polymer layer 801 on the exterior of the metallic teeth 807. The polymer 801 can be formed on the metallic gear hub 805 in any of the ways or methods described herein. For example, a gear blank can be formed and the gear blank can be trimmed to final dimensions, pressed onto a shaft, and then hobbed like the other designs into a final product comprising a gear assembly. Versions of the metallic teeth can engage the worm shaft even if the polymer layer is not present. Should the polymer fail, such a feature can provide redundancy for providing assistance to the vehicle operator. Thus, metal-to-metal contact can provide assistance to safely leave a roadway.

Embodiments of the metallic gear hub can comprise at least one of machined, cast, forged, stamped, hobbed and powder metallurgy. Embodiments of the polymer gear teeth can be at least one of molded, injection molded, pressed, induction heated, powder coated and bonded. Embodiments of the metallic gear hub can comprise a locating notch and the polymer gear teeth can be post-machined relative to the locating notch to form a uniform polymer thickness and the final gear teeth size. Some embodiments can allow for the net shape molding of the final gear teeth dimensions.

Embodiments of a method of forming a gear also are disclosed. For example, the method can include forming a metallic gear hub with metallic gear teeth that are smaller than a final gear teeth size of the gear; blasting the metallic gear hub to a desired surface finish; applying a primer to the metallic gear teeth; heating the metallic gear hub and dipping the metallic gear teeth in a fluidized bed of polymer powder; forming a polymer coating on the metallic gear teeth; and then processing the polymer coating on the metallic gear teeth to the final gear teeth size of the gear.

Some versions of the method can include injection molding the polymer with internal teeth to form a polymer ring, and attaching the polymer ring to the gear teeth. Other examples of the method can include trimming the polymer coating to a final size and hobbing the polymer coating.

Embodiments can include systems, methods and devices that form a polymer gear having teeth with a metallic core. The use of metallic core teeth can increase the robustness and torque-carrying capacity of the gear, while the polymer exterior can help maintain satisfactory NVH performance.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities can be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It can be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one of skill in the art would know to be a reasonable tolerance for the parts mentioned.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or essential feature of any or all the claims.

After reading the specification, skilled artisans will appreciate that certain features which, for clarity, are described herein in the context of separate embodiments, can also be provided in combination in a single embodiment. Conversely, various features that are, for brevity, described in the context of a single embodiment, can also be provided separately or in any subcombination. Further, references to values stated in ranges include each and every possible value within that range.

We claim:

1. A gear, comprising:
a metallic gear hub consisting of a monolithic gear core that is cast, forged or formed by powder metallurgy, the metallic gear hub having an axis of rotation and metallic gear teeth that have roll, pitch and yaw axes, and the metallic gear teeth are smaller than a final gear teeth size of the gear;
wherein the metallic gear teeth are co-planar with each other relative to the axis of rotation, and the metallic gear teeth are non-orthogonal relative to the rotational axis and are oriented at an acute angle of rotation relative to the yaw axis of the metallic gear teeth; and
a polymer layer on the metallic gear teeth to form polymer gear teeth on the metallic gear teeth, wherein the polymer gear teeth comprise the final gear teeth size of the gear.

2. The gear of claim 1, wherein the acute angle of rotation relative to the yaw axis is in a range of about 30 degrees to about 60 degrees.

3. The gear of claim 1, wherein each of the metallic teeth comprises a shape that is rectangular with rounded corners.

4. The gear of claim 1, wherein a polymer axial width of the polymer gear teeth exceeds a metallic axial width of the metallic gear teeth.

* * * * *